United States Patent
Meeker

(10) Patent No.: US 10,785,964 B2
(45) Date of Patent: *Sep. 29, 2020

(54) SUBMERSIBLE NET PEN SYSTEM

(71) Applicant: HEXTECH CANADA LTD., Evansville (CA)

(72) Inventor: Michael Thomas Meeker, Evansville (CA)

(73) Assignee: HEXTECH CANADA LTD., Evansville, Ontario (CA)

(*) Notice: Subject to any disclaimer, the term of this patent is extended or adjusted under 35 U.S.C. 154(b) by 305 days.

This patent is subject to a terminal disclaimer.

(21) Appl. No.: 15/772,438

(22) PCT Filed: Apr. 5, 2017

(86) PCT No.: PCT/CA2017/050419
§ 371 (c)(1),
(2) Date: Apr. 30, 2018

(87) PCT Pub. No.: WO2017/173543
PCT Pub. Date: Oct. 12, 2017

(65) Prior Publication Data
US 2018/0317461 A1 Nov. 8, 2018

Related U.S. Application Data

(60) Provisional application No. 62/318,274, filed on Apr. 5, 2016.

(51) Int. Cl.
*A01K 61/60* (2017.01)
*A01K 61/10* (2017.01)

(52) U.S. Cl.
CPC .............. *A01K 61/60* (2017.01); *A01K 61/10* (2017.01); *Y02A 40/826* (2018.01)

(58) Field of Classification Search
CPC ...................................................... A01K 61/10
See application file for complete search history.

(56) References Cited

U.S. PATENT DOCUMENTS

| 4,244,323 A | 1/1981 | Morimura |
| 7,661,389 B2* | 2/2010 | Tuerk ............ A01K 61/60 |
| | | 119/223 |

FOREIGN PATENT DOCUMENTS

| WO | 8703170 A1 | 6/1987 |
| WO | 2012092380 A2 | 7/2012 |
| WO | 2013032818 A1 | 3/2013 |
| WO | 2015099540 A1 | 7/2015 |

OTHER PUBLICATIONS

International Search Report and Written Opinion issued in PCT/CA2017/050419 dated Jul. 21, 2017.

* cited by examiner

*Primary Examiner* — Monica L Barlow
(74) *Attorney, Agent, or Firm* — Carter, DeLuca & Farrell LLP

(57) ABSTRACT

There is disclosed herein a submergible net pen system including for receiving a net, the system including: at least four support members; a plurality of span members connecting the support members, wherein the support members and span members collectively notionally define a pen volume; at least one chamber affixed to one or more of the span members and the support members; and at least one compressor in fluid communication with the chamber to selectively inflate the chamber with a gas.

16 Claims, 10 Drawing Sheets

SUBMERSIBLE NET PEN SYSTEM

FIELD

The present disclosure relates to pens for fish farming and more specifically to a submersible net pen system.

BACKGROUND

Dealing with operational considerations, many of which result from weather or other environmental concerns, is a constant challenge in the fish farming industry. Technology and methods have evolved to attempt to optimize production and minimize risks (be they of underproduction, stock theft, or device failure). Early fish farming cage designs used wooden logs for strength and forty-five gallon or other drums for buoyancy (i.e., as what are commonly referred to as "floats"). It has since been an evolution of designing and building stronger and stronger cages; however, the bulk of such designs require that the cage floats of the surface of the body of water in which it is deployed. Float tubes are employed in many such designs to hold in place the related systems. These tubes are commonly disposed in a generally horizontal orientation. This is problematic as it lends itself to movement, buckling and twisting in view of movement of the body of water. This issue is made worse in situations of high winds and/or waves (both of which are not uncommon). This can and all too often does lead to cage failure. The severity of this issue is further is increased by use of multiple and larger cages, often in an interconnected manner. While this may be convenient for management and harvesting, it exacerbates issues of structural integrity and can result in problems with one cage translating to similar or other issues in adjacent ones.

Many commercially available designs use cages that are, for example, geometries approximating a square of fifteen by fifteen or twenty by twenty metres. Water movement and cage geometry often result in significant and differently directed forces acting on the various components of the cage, and resultant shearing, tearing and compression of the components in a generally disadvantageous manner. As such, it is advantageous to minimize the impact of, for example, moving water (be it at the surface or below; although the horizontal designs commercially available are particularly susceptible to damage at the surface), and wind (at or above the surface) though known designs do little to achieve such minimization. For example, big waves put an enormous amount of stress on hinges at the water's surface, with such hinges connect various parts of the cages, leading to a negative impact on overall structural integrity and positional stability. It is similarly very difficult to anchor these components because of the forces that are working against them.

Cage design is further complicated by the fact that, while it is advantageous to employ cages in regions with cold climates (e.g., in view of the location or movement/migration patterns of various, different species of fish), seasonal ice is common in such regions. Ice encasing components of cages can lead to catastrophic results, particularly when the ice shifts. This is of greatest concern in geographic regions in which thick ice forms during the winter (e.g., 40 inches of ice is not uncommon in some parts of Canada, and other places). When this ice melts and starts to break free from the shore there are formed rather massive ice flows. In some instances, such flows are a square mile or more in surface area, and can damage cages by tearing them apart, or by impacting them when moving in the water. There is no practical means of stopping or diverting the movement of such ice (which tends to be at and may extend slightly below the surface of the water).

As such, there is a need for caged pen system that will eliminate and/or mitigate one or more of the risks, problems and shortcomings outlined above.

BRIEF SUMMARY

There is disclosed herein a submergible pen system for receiving a net. The system includes at least four support members; a plurality of span members connecting the support members, wherein the support members and span members collectively notionally define a pen volume; at least one chamber affixed to one or more of the span members and the support members; and at least one compressor in fluid communication with the chamber to selectively inflate the chamber with a gas.

In another disclosed aspect, the at least three support members comprises at least six support members.

In another disclosed aspect, the at least six support members comprise at least eight support members.

In another disclosed aspect, one or more of the support members is operationally positioned in a substantially vertical orientation.

In another disclosed aspect, the support members are positioned in a substantially hexagonal arrangement.

In another disclosed aspect, the support members are positioned in a substantially octagonal arrangement.

In another disclosed aspect, the plurality of span members comprises at least one span member connecting each of the support members to at least an adjacent one of the support members.

In another disclosed aspect, the system and/or the span members further comprise hinge and joint members to connect the segments thereof or to the support members.

In another disclosed aspect, the hinge and joint members comprise connection members and vibration dampening members.

In another disclosed aspect, the at least one chamber comprises a plurality of chambers.

In another disclosed aspect, the plurality of chambers comprises three chambers, wherein each of the support members comprises a plurality of segments, and the chambers are one each provided in the segments of the support members.

In another disclosed aspect, the chambers are provided in fluid communication each with at least one of the compressors.

In another disclosed aspect, the chambers are each inflatable to an inflated volume and wherein the magnitude of each said inflated volume is different.

In another disclosed aspect, the system further comprises a controller in electronic communication with the compressor for controlling the operation thereof.

In another disclosed aspect, the system further comprises one or more sensors for gathering sensed data comprising operational and environmental data, and wherein the sensors are in electronic communication with the controller to provide the sensed data to the controller for processing thereby.

There is also disclosed herein a submersible pen system comprising at least four support members; a plurality of span members connecting the support members with the support members and span members collectively notionally defining a pen volume, one or more net portions connected to one or more of the support members and the span members to substantially encase the pen volume, at least one chamber affixed to one or more of the span members and the support members; and at least one compressor in fluid communication with the chamber to selectively inflate the chamber with a gas.

There is also disclosed herein a method of operating a net pen system, the method comprising: determining one or more operational characteristics of the net pen system via one or more sensors, and adjusting an inflation volume of one of more chambers, wherein the inflation volume of each of the chambers comprises the quantity therein of a gas, in response to the characteristics, and thereby adjusting an operation depth of the net pen system.

In another disclosed aspect, the characteristics comprise environmental data.

DESCRIPTION OF FIGURES

There are submitted herewith various drawings showing an exemplary embodiment of the disclosed systems and methods.

DETAILED DESCRIPTION

Figure 1:
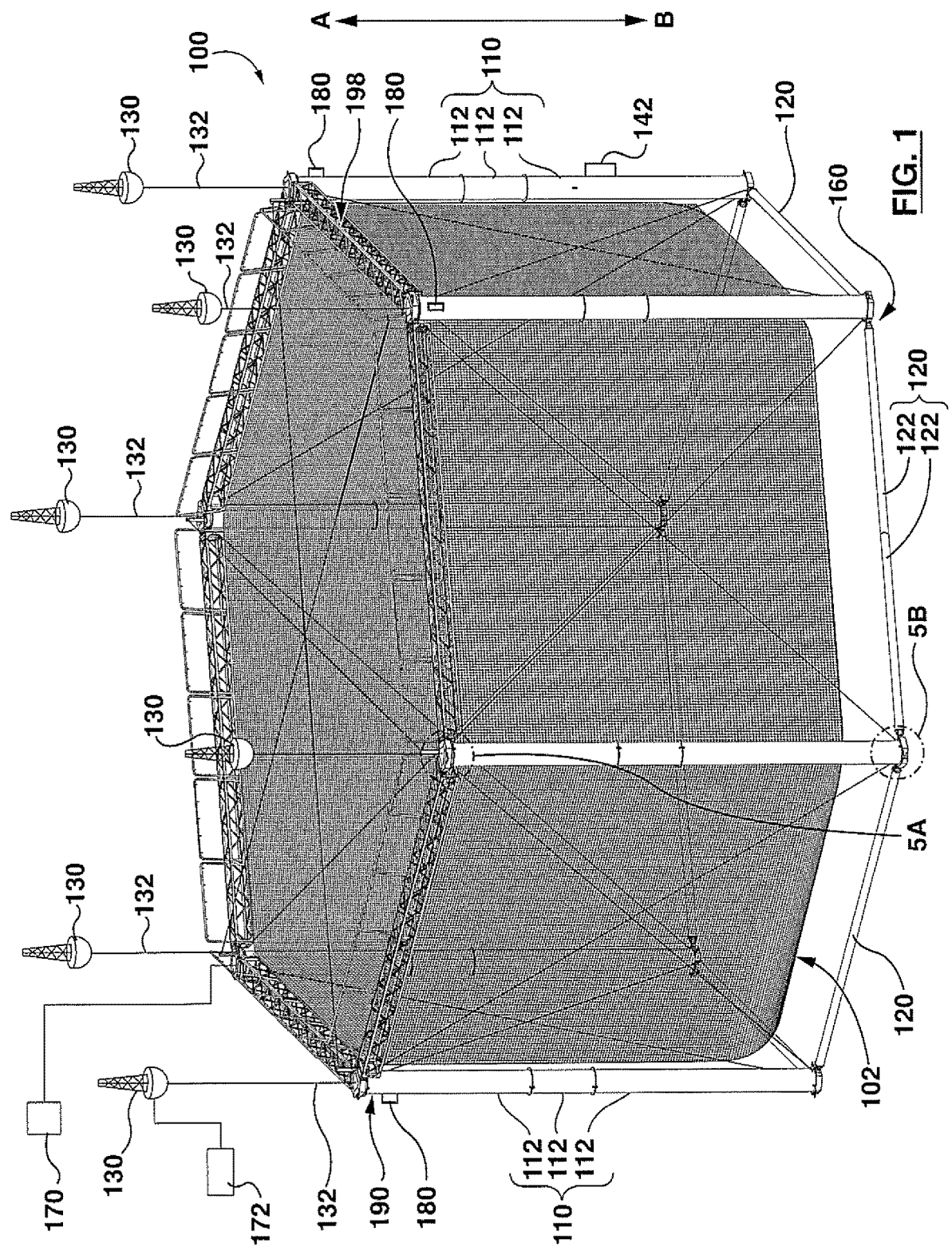
FIG. 1 is a perspective view of a net pen system.

There is disclosed herein systems 100 and methods 200 aimed at eliminating and/or mitigating one or more of the risks, problems and shortcomings discussed above. The disclosed systems 100 may preferably be provided in a hexagonal (see, FIGS. 1 and 6) or octagonal arrangement, which arrangement may generally be defined by the arrangement of support members 110 therein (although other arrangements may be used). Arrangements such as the hexagonal one shown in FIG. 1, serves to help achieve greater pen volumes than arrangements with less support members 110. Improvements in terms of dispersal of energy imparted to the system 100 from impacting water (such as underwater current or surface waves) may also be achieved by way of the geometry of the individual support members 110. For example, in some embodiments (see, for example, FIG. 1), six vertical support members 110 having a generally tubular or cylindrical appearance are provided, with each having an approximately 30 inch diameter. These support members 110 are provided with a substantially cylindrical shape (see FIG. 2, 4A, 4B), to provide minimal flat surfaces for waves and water flow more generally to act directly against in a substantially lateral direction so as to torque such supports about a central axis A-A thereof. While cylindrical configurations are shown, other support member 110 geometries may be employed (e.g., generally cylindrical shapes with flat portions) to facilitate flow by of and minimal impact with passing water.

Waves will generally break around the vertical 30 inch diameter support members 110, with the primary source of resistance to the wave or current action then being the net 102 or segments 104 thereof; however, waves will typically move through the nets 102 with relative ease. The disclosed design significantly reduces the resistance for water encountering the system 100, which reduces the risk of failure of or damage to the system 100. While avoiding failure is a primary concern, reducing even more moderate levels of damage is advantageous as it limits loss of stock and minimizes repair and replacements expenses. Such costs can be significant, and the down time related to repairs and/or replacements is quite costly, too; this is particularly so in more rugged (e.g., remote and/or colder) environs.

The disclosed systems 100 are also positionally stable when deployed in the water. This is also a consequence of minimizing resistance and impact of water. The limitation of movement is not just a consideration from a horizontal movement perspective, but also vertically. In some embodiments, the system 100 may be effectively bottom weighted, which acts to further ensure stability (as also discussed herein). For example, in waves of about 2 meters, the disclosed system 100 will generally only permit movement up and down a few inches, which serves to minimize stress on hinges 160 (see, FIGS. 5A, 5B, 7A, 7B) and other junctions between components. While hinges 160 are designed to have much greater strength than necessary for day to day operation, this area is not an uncommon point of breakage or damage. Further commentary regarding hinges 160 and components thereof is provided below.

The disclosed system 100 also exhibits advantageous properties vis-à-vis submersibility. Some embodiments are provided such that they may be submerged in under 2 minutes (for example, some embodiments may be submerged to operational depths or from a present depth to another desired depth, in about 1 minute and 45 seconds).

The value of this feature is heightened by the ease of activation. There may be provided a single valve 170 control to turn (either directly or via remote control). This will allow for movement of the system 100 to a safe depth through release of a gas from at least one chamber 140. The particular depth will depend on weather/ice or other adverse conditions, and the system 100 may be sunk to a level suitable to avoid damage or loss.

Being able to move the cage (system 100) to a deeper depth also facilitates avoidance of theft (e.g., during times when the staff is not present). Given the high value of many fish, and the systems 100 themselves, this can be a significant problem.

Figure 4A:
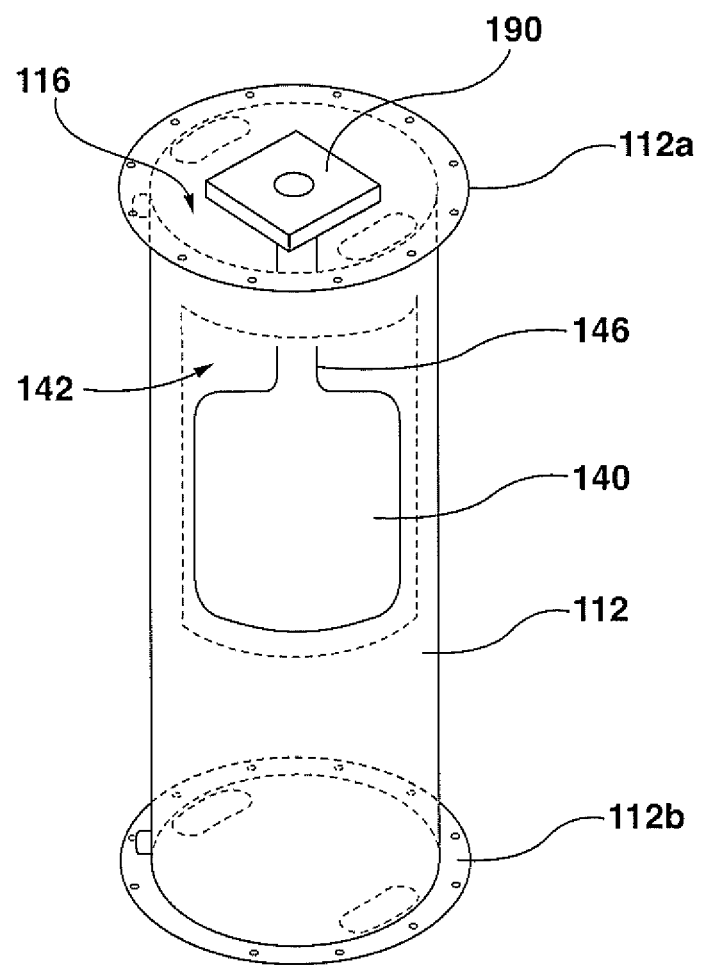
FIG. 4A is an enlargement of area 4A shown in FIG. 2.
Figure 4B:
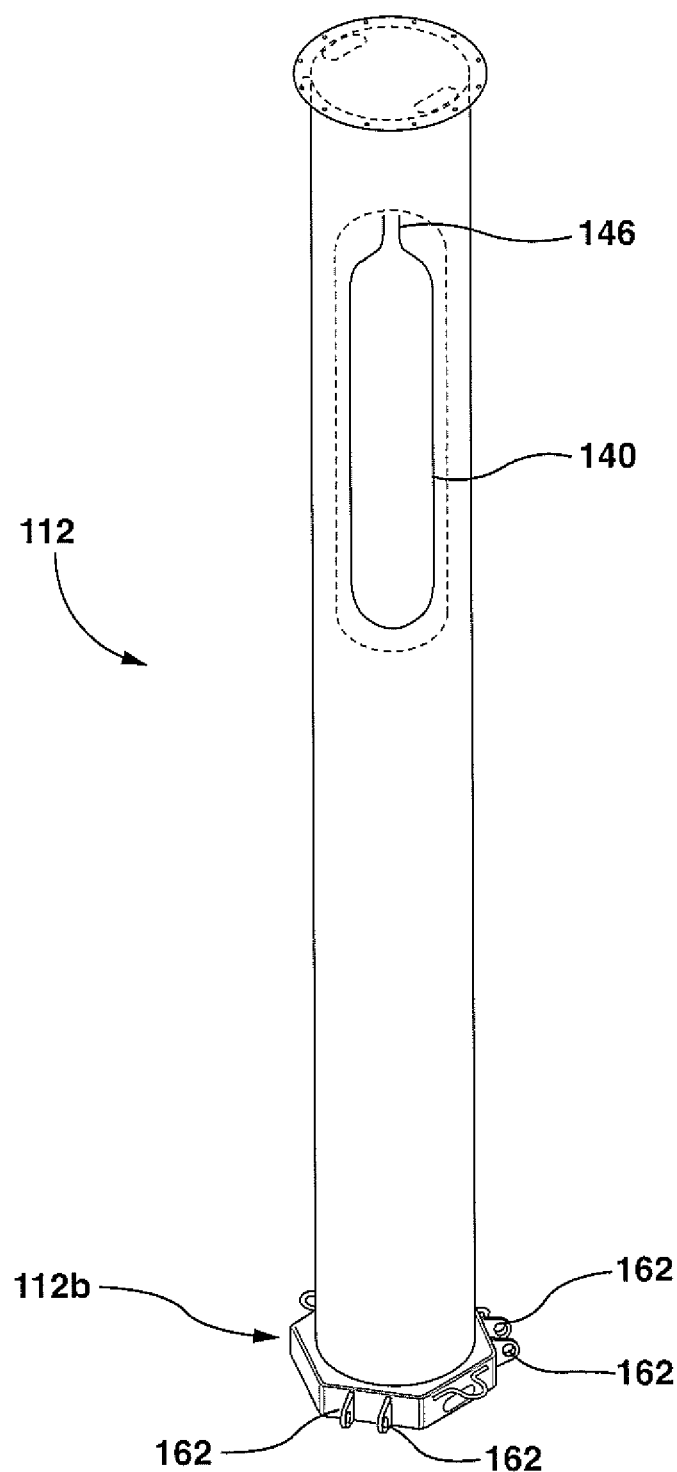
FIG. 4B is an enlargement of area 4B shown in FIG. 2

How the system 100 is raised or lowered also produces certain advantages. This is achieved via pneumatic processes. One or more (and preferable all) of the supports members 110 is provided with a bladder (or chamber) 140 therein which may be selectively inflated or deflated. As discussed below, there may preferably be a trio of chambers 140 provided in each support member 110 (see segments 112 thereof in FIGS. 2, 4A, 4B). Further, there may be a provided a manifold 190 which may be connected to a compressor 144, which may be used to fill the chambers 140 to desired inflation levels. In many cases, a ~5 horsepower compressor may be sufficiently powerful; however, the selection of a compressor strength may be made as a design choice. Generally, more powerful compressors 144 will aid in more quickly raising the system 100 by more quickly inflating the chambers 140.

Different fish farmers operating in different locations and in respect of different species of fish may have different needs, such that different sizes of cages or pen systems 100 may be ideal for different farmers. While designs of a hexagonal configuration may be preferred in, for example, Ontario, Canada; more modular or further sided designs may be employed in, for example, oceanic environments. In such environments, more fish may be grown per cage, such that 7 or 8 sided cages may be employed to expand the rearing space. In some cases, such expansion increases risk of failure (e.g., more hinged joints; more interconnections between adjacent or associated cages); however, these concerns are reduced by the features herein disclosed.

The disclosed systems 100 have features aimed at avoiding sinking thereof to the bottom of the given body of water. It is generally a problem in the art to submerge, maintain and surface the cage 100. There is provided a plurality of the chambers 140 in each support 110, and these chambers 140 are provided separated from one another. This is so that failure of one chamber 140 need not impact functionality of the others. In some embodiments, three chambers 140 may be provided, as in each segment 112 in FIG. 2. Two of such chambers 140 are preferably variable buoyancy chambers (again, these may be selectively and remotely inflated or emptied). So, if a user wishes to adjust depth such that a working platform 198 so that it is 6 feet out of the water for workers to work thereon, this may be accomplished. And if it is desired to lift the cage 20 feet out of the water so that it is shallower in the body of the water, perhaps so that it can be at that point towed into shallower areas and then dropped back down into normal operating depth.

Looking to FIG. 1 again, there is shown the submergible pen system 100 which is provided for receiving or includes a net 102. The net 102 may be provided in segments 104. The number and geometry of segments 104 may vary from embodiment to embodiment but the function of the net is typically to encase a pen volume which is notionally defined by support members 110 and span members 120, and the shape of which is generally indicated by the net 102 in FIG. 1.

Figure 2:
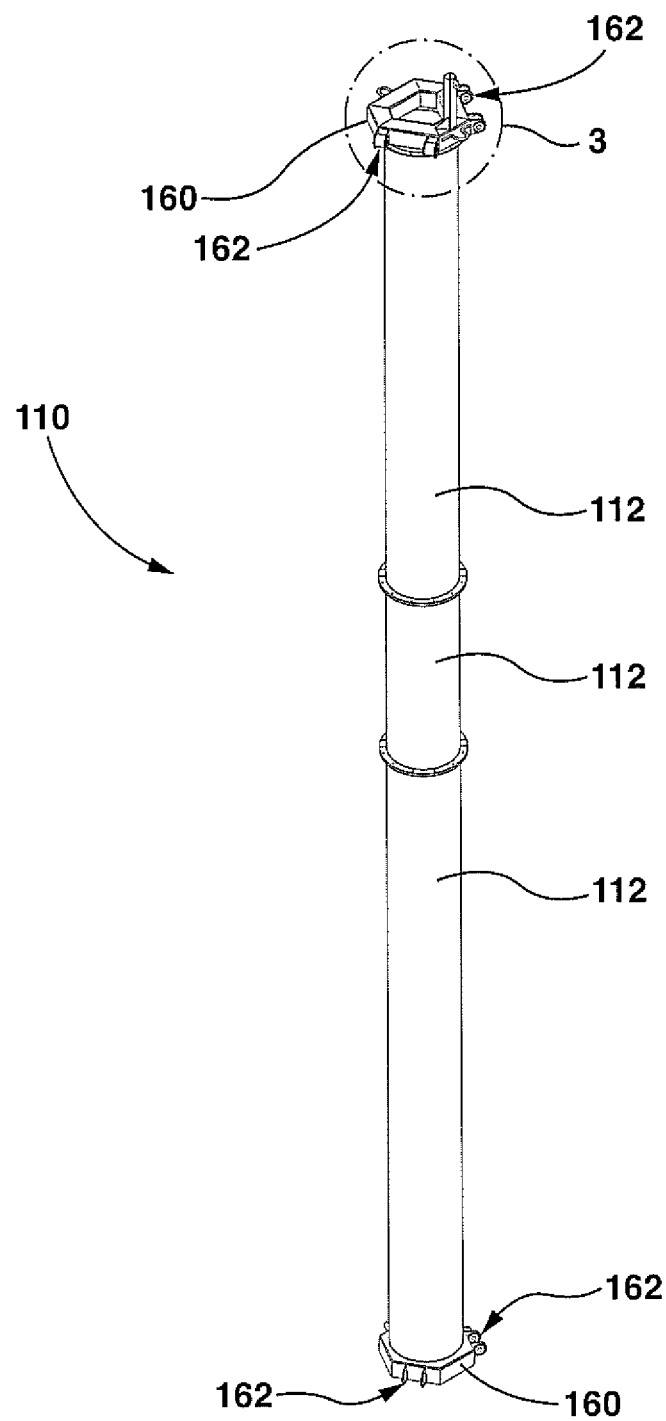
FIG. 2 is a perspective view of an enlargement of a support member shown in FIG. 1.

The system 100 includes at least four of the support members 110. At least six support members 110 may preferably be provided, and operationally positioned in a substantially hexagonal arrangement, as shown in FIG. 1. However, to reiterate, it will be appreciated that other numbers and arrangements of support members 110 are contemplated and disclosed herein. Different farmers, in different locations, have different ideal sizes of cage systems. In some cases, hexagonal designs may be preferable. But in larger scale operations, and as generally discussed above, there is a desire to grow more fish per cage, such that the relative modularity of the design allows for, for example, an 8-sided (including octagonal) cage. The increase in cost from a six-sided to eights-sided cage is typically about one third, but there can be a doubling of available rearing space.

The support members 110 are operationally positioned in a substantially vertical orientation, as shown in FIG. 1. When referring herein to disclosed features or articles when such are "operationally positioned," it will be understood that this is aimed at discussions of configurations of disclosed embodiments when deployed or assembled for deployment in or about an aquatic environment. Turning back to the orientation of the support members 110, in some embodiments these will be provided in non-vertical positions. This will be dependent on, among other things, the position, number and orientation of the span members 120 (discussed in more detail below). Orientations at or within 10-15 degrees of vertical are preferred. Other configurations and orientations may be employed, depending on the confines of the operational environment, as well as the number, shape and orientation of span members 120. The support members 110 are comprised of galvanized or otherwise treated steel, to resist corrosive effects of salt water or fresh water (or, in some embodiments, non-metallic materials may be used where load requirements permit the same; further, in some embodiments, support members 110 comprise multiple segments 112 that are fastened and/or welded together). The support members 110 may each further include a casing 114 internal or external thereto, defining at least one conduit 116 through or about the support members 110. Operational parameters may affect sizing, but the support members 110 may each have an approximately 30 inch cross-sectional diameter. The support members 110 may preferably be provided in generally cylindrical shape to aid in deflection of water impacting them from as many directions as possible. While cylindrical configurations are shown, other support member 110 geometries may be employed to facilitate flow by of and minimal impact with passing water.

The generally vertical orientation of the support members 110 (e.g., those 30 inches in diameter and having a generally cylindrical shape) provide less for water to impact in a manner torqueing thereon. Water will more easily break around the substantially vertical support member 110 with the resistance posed by the nets 102 being much more minimal and generally necessary.

The disclosed systems 100 are also very stable when operationally positioned in the water, resisting movement. Waves generally break around the support members, and bottom heavy nature of the cage 100 acts in manner not dissimilar to the keel of a ship, adding stability to the whole structure. Operationally, the cage 100 will generally only move a few inches up and down, minimizing stress on hinges 100 (which are, in any case, designed with a factor of safety in mind).

The span members 120 are provided to connect the support members 110 and provide stability to the overall system 100. At least one span member 120 will be provided to connect each of the support members 110 to at least an adjacent one of the support members 110; and, in some embodiments, support members 110 may be clustered in pairs or greater numbers (i.e., without intervening span members 120) for structural or aesthetic reasons. One or more of the support members 110 and the span members 120 is adapted to receive and attach to the net 102 to substantially encase the pen volume.

Figure 6:
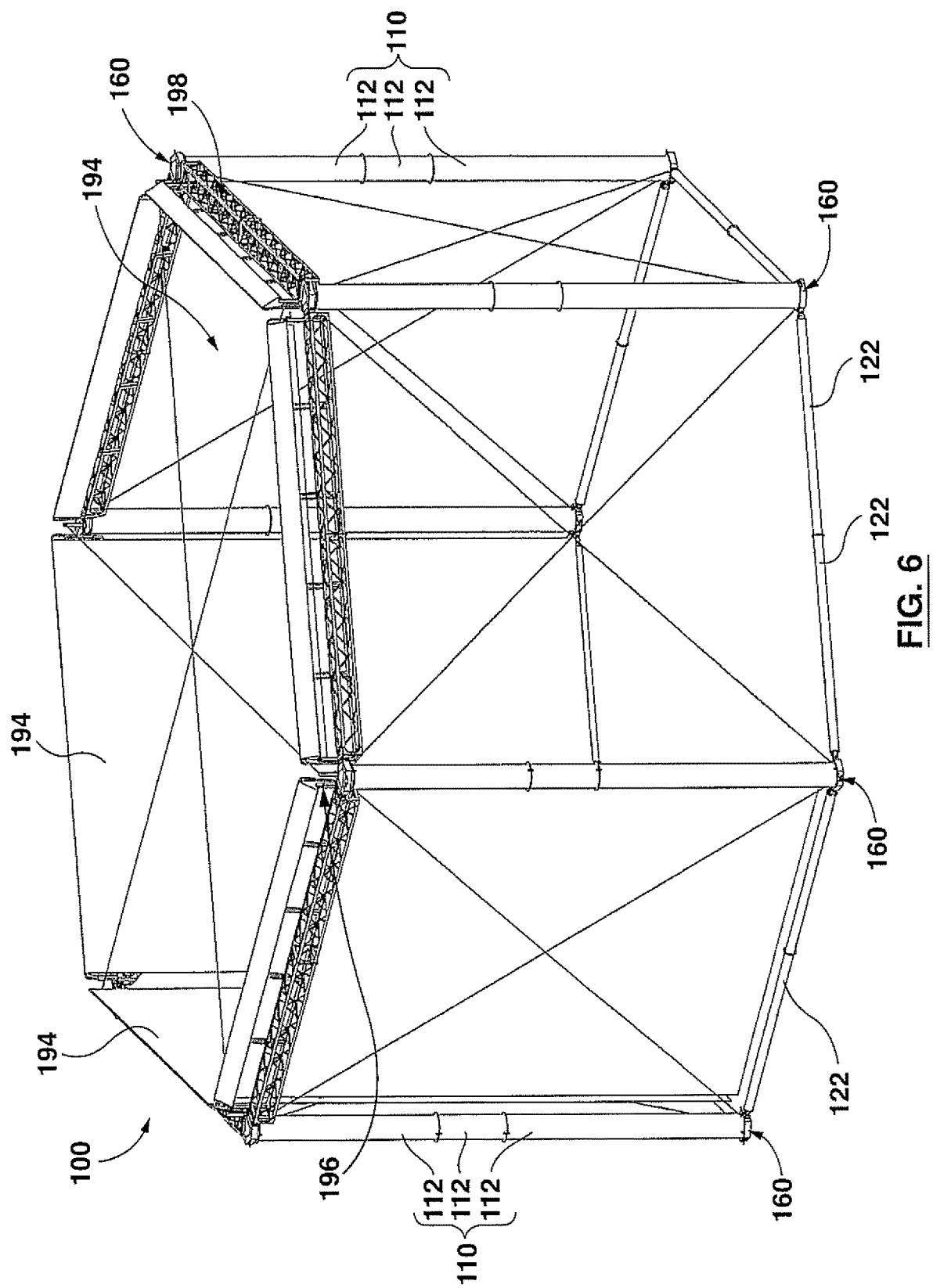
FIG. 6 is a perspective view of another embodiment of a net pen system.
Figure 7A:
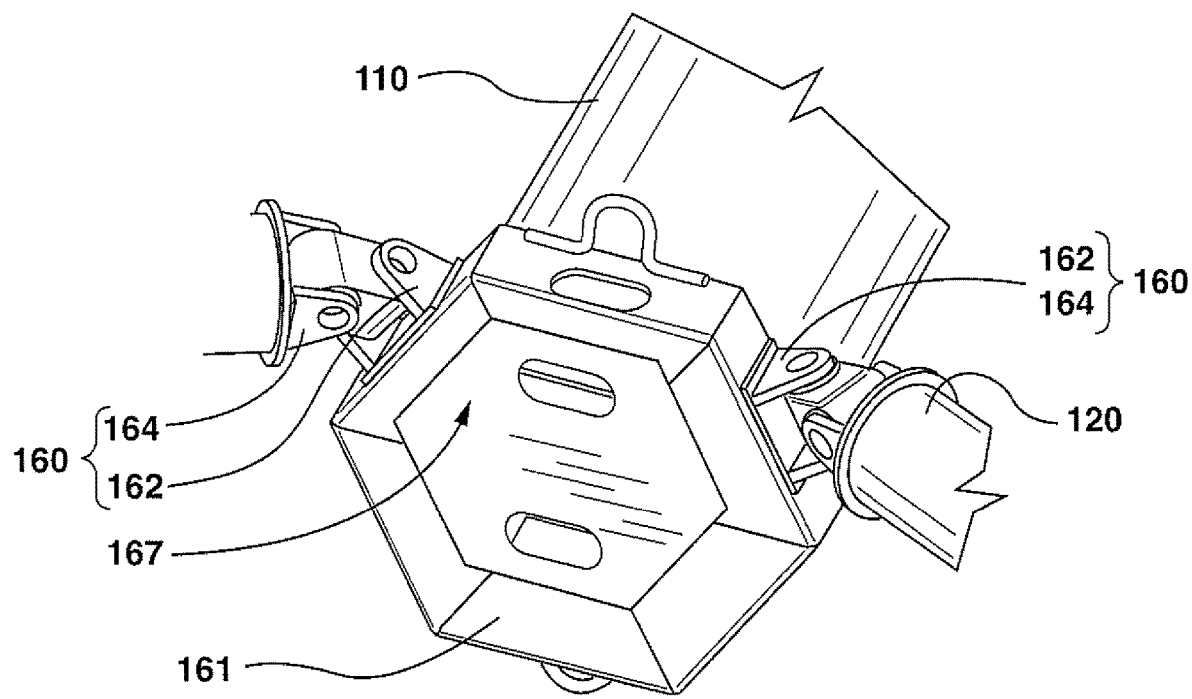
FIG. 7A is a bottom perspective view of the enlarged area shown in FIG. 5A.
Figure 7B:
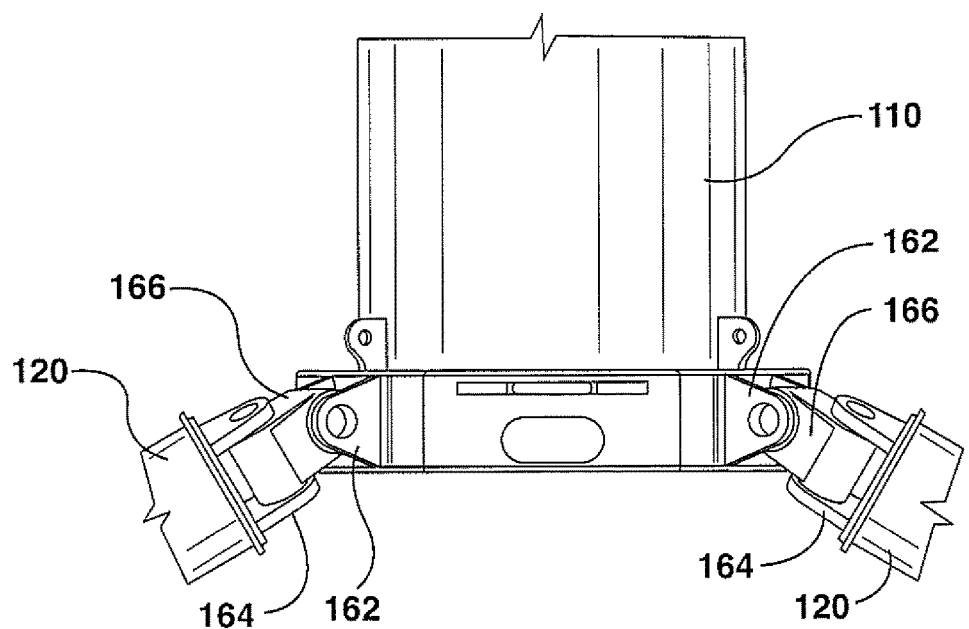
FIG. 7B is a side view of the enlarged area shown in FIG. 5B.

At least one span member 120 connects each of the support members 110 to at least an adjacent one of the support members 110. The plurality of span member 120 comprises at least two span members 120 connecting each of the support members 110 to an adjacent one of the support members 110. Each of the span members 120 is preferably operatively positioned substantially normal to the support member(s) 110 to which is it attached (as shown in FIGS. 1 and 6). Some of the span members 120 may be positioned diagonally relative to the support members 100. Reasons dictating placement and orientations of span members 120 include cage shaping design, ensuring structural rigidity, and/or facilitating placement of additional equipment. The span members 120 may each be provided in segments 122, and the segments 122 may be oriented with respect to one another (e.g., in zig-zag or other patterns of alternating or differing directions). Some of the span members 120 may be provided in substantially straight shaping, whilst other designs may require substantially curved orientation. Each of the span members 120 is preferably connected to at least two of the support members 110 and is connected to a first one of the at least two of the support members 110 at a first connection point 124 and to a second one of the at least two support members at a second connection point 126, as shown in FIG. 1. The first connection point 124 may be at a first end 110a of the first one of the support members 110. Respective ones of the first ends of the first and second one of the support members may be similarly oriented.

Figure 3:
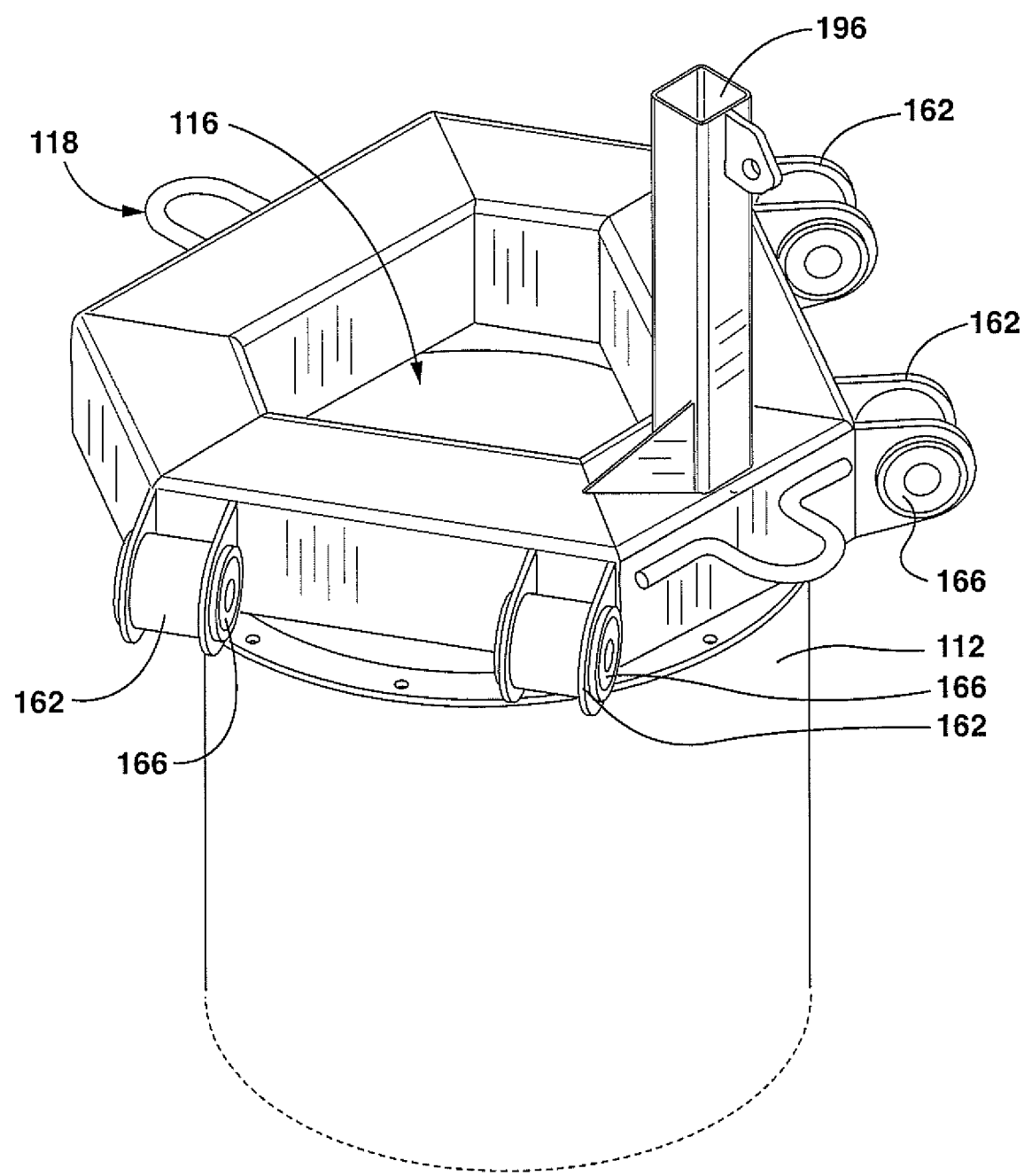
FIG. 3 is an enlargement of area 3 shown in FIG. 2.
Figure 8:
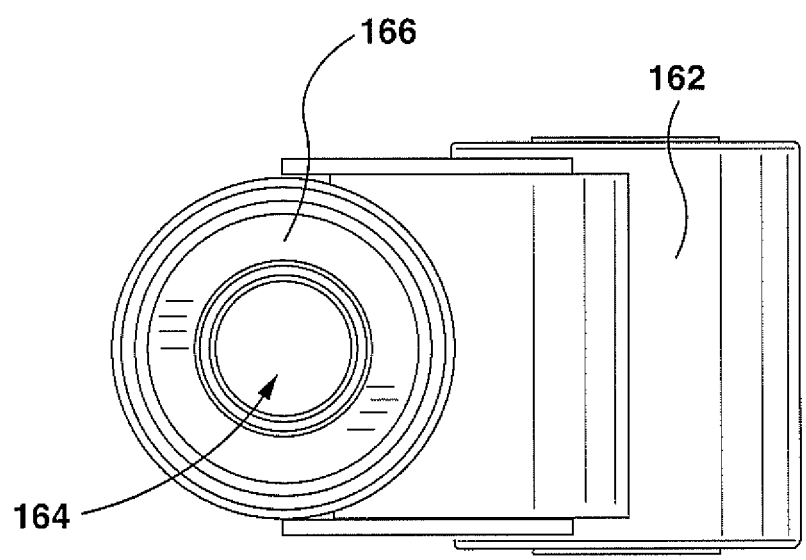
FIG. 8 is an enlarged view of a portion of a hinge assembly shown in FIG. 7B.

The system 100 and, more specifically the span members 120 may further comprise hinge and joint members 160 to connect the span members 120 to the support members 110. The hinge and joint members 160 may comprise complementary, mating components 162, 164 respectively disposed on each of the support 110 and span 120 members (see, for example, the enlargement of area 3 from FIG. 1 shown in FIG. 3), to operationally join them. These hinges 160 facilitate some absorption of forces of water passing thereby without diminishing overall stability. The span members 110 may further comprise the first one of the hinge members 162 for mating with a second one of the hinge members 164 provided on a separate one of the hinge members or the support members. Each hinge members comprises an elbow member 162 wherein the elbow member is articulable through a range of motion, which comprises one or more of range of flexion; range of extension; range of rotation about one or more axes. The hinges 160 may also include vibration dampening members 160, such as the bushing 166, shown in at least FIGS. 5A, 5B, and 8.

As more generally discussed above, and as will be appreciated from a consideration of FIG. 1, the support members 110 and span members 120 collectively notionally define the pen volume (which is also generally represented by the net 102). While hexagonal arrangements of support members 110 are shown, other arrangements may be provided (as discussed herein) which will alter the shaping of the pen volume 130. The geometry of the net 102 may preferable map quite directly to the pen volume but need not necessarily be firmly shaped thereto. The level of tension in the net 102 is a matter of design choice for one skilled in the art.

Figure 5A:
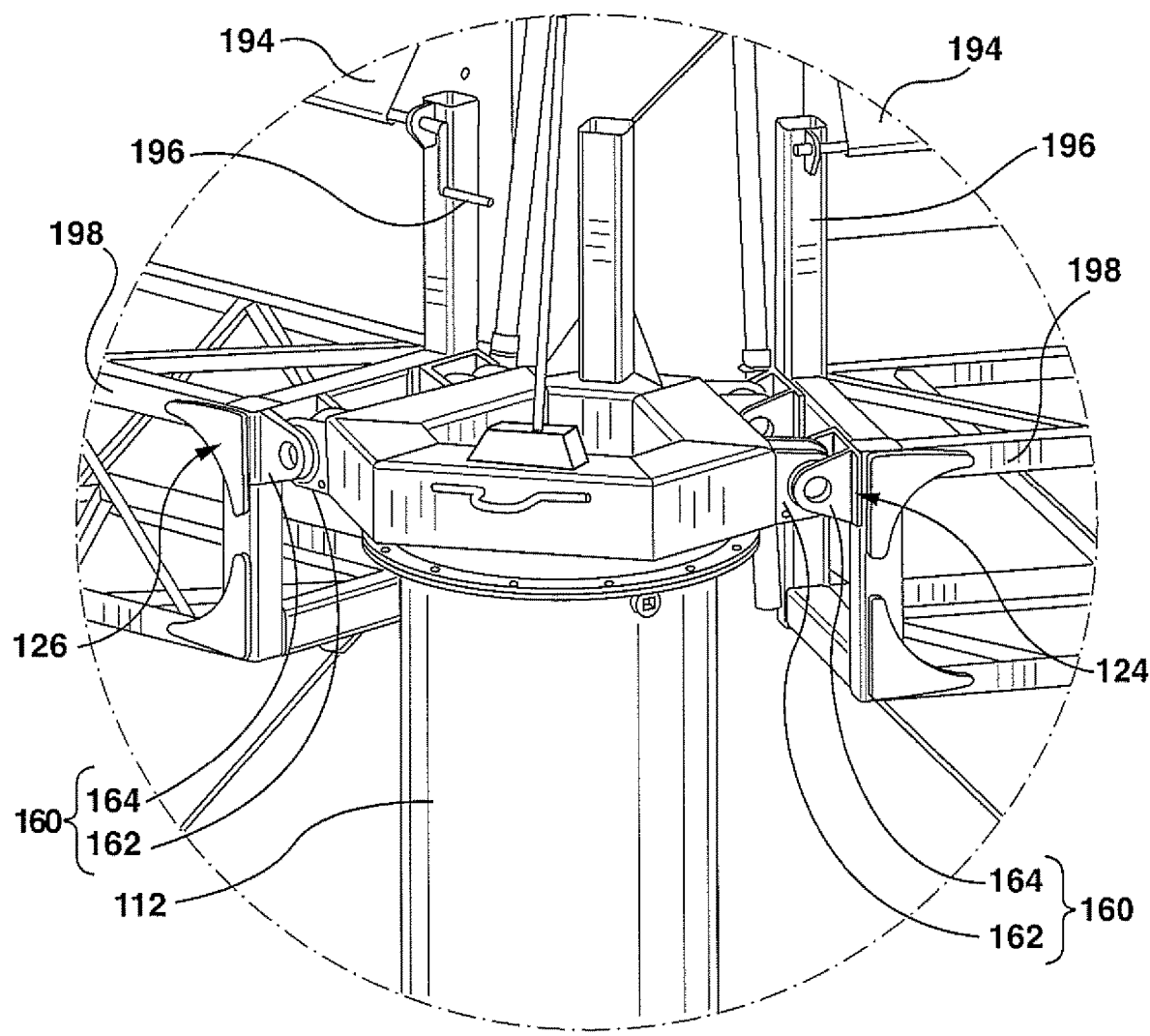
FIG. 5A is an enlargement of area 5A shown in FIG. 1.
Figure 5B:
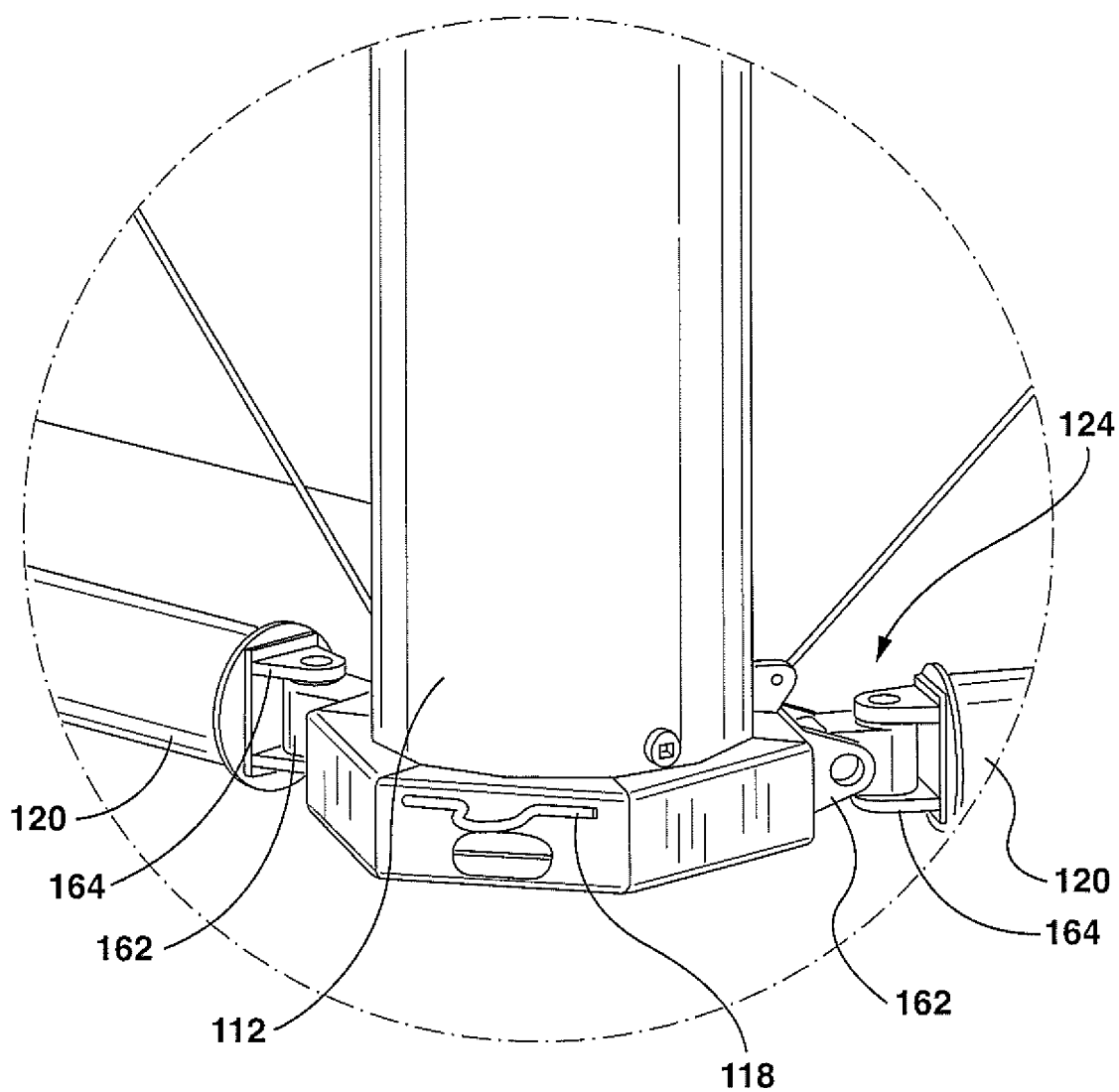
FIG. 5B is an enlargement of area 5B shown in FIG. 1

The chamber 140 is preferably in the form of inflatable bladders 140. Selective inflation and deflation of the chamber(s) 140 will function to raise, lower or maintain the position of the system 100 in a body of water, e.g., the distance relative to the surface or floor of such body of water with such movement generally represented by arrow A-B in FIG. 1. The chamber(s) 140 will be provided affixed to or defined in one or more of the span members 120 and the support members 110. In some embodiments, there is provided a provided housing 142 affixed to the exterior of the support members 110 to enclose bladder 140 chamber. The chambers 140 may preferably be provided within the support members 110, as shown in FIGS. 5A-5B. A plurality of chambers 140 may be provide. Each chamber may be an inflatable bladder 140, and each of the chambers may be provided having the capacity to inflate to an inflation volume which may be different than that of the other bladders 140. The precise capacities of the bladders 140 will be determined based on the configuration of the system 100, with factors including the depth of the implementation environment, the number of support members 110, the number of segments 112 there, the number of span members 120, the desired speed of depth adjustments of the system 100. Each of the chambers are provided in fluid communication each with at least one of the compressors 144. As listed above, chambers 140 are each inflatable to an inflated volume or less than the inflated volume. This provides for selective inflation and deflation of the chambers 140 to apply or remove lift by way of buoyant forces acting on the system 100. The compressor 144 is provided in fluid communication with the chambers 140 so as to selectively inflate the chamber 140 with a gas (which is preferably air). The bladders 140 are preferably positioned in or about the span 120 or support 110 members and are preferably comprised of rubber which may be reinforced. Each housing 142 is formed from a substantially rigid material so as to serve as a protective barrier between the bladders 140 and wherein each housing 142 is attached to one or more of the support members 110 and the span members 120. Each housing 142 may be integral to one or more of the support members and the span members.

The system 110 further comprises one or more hoses 146 connecting the chambers 140 to the manifold 190 or, in some embodiments, the compressors 144. The manifold 190 is shown as included within one of the support members 110; but, it may alternatively or additionally be provided on a buoy 103 or be otherwise positioned between compressors 144 and bladders 140. Further, multiple manifolds 190 may be used in some embodiments. The conduit 116 provides a pathway and protection for the hoses 146 end and mechanical or electrical componentry running therethrough.

A controller 172 may be provided, in electronic communication with the compressor 144 and the manifold 190 for controlling the operations thereof. Sensing apparatus 180 may be employed to warn of and respond to adverse conditions (be they water movement, approaching ice, ice movement, or other adverse conditions). Further, the system 100 may be in electronic communication with weather monitoring systems which the sensing apparatus 180 may comprompise, and may respond to provision of warnings of incoming weather (e.g., by submerging the system 100 to level suitable to avoid damage based on expected conditions). Sensors 180 for gathering operational and environmental data are also provided, with the controller 172 being responsive to the data. The controller 172 may comprise a computing device but may also, in some embodiments wherein controller 172 actions are not or not solely responsive to sensor 180 data, include on/off device controls (which may comprise at the 170 valve). In other cases, the controller 172 may be a desktop, laptop, tablet or handheld computing device. The electronic communication may preferably be by way of wired or wireless connection. The system 100 may multiple ones of the sensors 170 and the operational and/or environmental data may be regarding one or more aspects of the system 100. The controller 172 is responsive to the data for altering one or more operational parameters, namely inflation volumes of the chambers 140 and, by extension, the submerged level of the system. In some embodiments, the sensors 180 may provide cues to prompt action vis-à-vis inflation or deflation of the chambers 140. In some embodiments, selective inflation and/or deflation of the chambers 140 may alternatively be set on a timer or programmable cycle.

This cycle may be a function of, for example, weather, water temperature, wind conditions. The sensors 180 may also or alternatively be responsive to weather data to implement changes in bladder 140 inflations so as to alter the depth and/or orientation of the system 100. Electrical hardware will be provided to connect the componentry of the system 100, with wireless connections being used where practicable. The sensors 180 will preferably be provided attached to one or more of the support members 110 and the span members 120. In some operational environments, the sensors 180 may be positioned remotely from the support members 110 and span members 120.

The manifold 190 may be interposed between chambers 140 and the compressor 144. The manifold 190 serves to disperse the gas from the compressor 144 in a desired manner and rate. This may be determined by the controller 172. In some embodiments, redundancy may be provided by way of additional compressors 144 or manifold 190 to allow for continued operation if a single compressor 144 is not operational. While submersibility is helpful and goes beyond earlier designs, it is also advantageous to be able to quickly adjust the depth to which the cage 100 is submerged (be it moving from the surface down, or moving up or down beneath the surface). In some embodiments, adjustments downward are made by turning a single valve 170 to allow the release of air from the chambers, with the destination depth being set by way of the level of gas remaining in one of the chambers 140 (be it 5 feet below the surface, or depths up to and beyond forty feet below the surface). Weather and water conditions may generally dictate what is a "safe" depth, and the ability to make quick changes in the submerged depth of the cage is critical in terms of avoiding potentially damaging extreme conditions.

Some embodiments may also incorporate a cover, such as a tarp 194 as shown in FIG. 6. Coverage features often need to be deployed quite quickly, to avoid contaminants entering the cage or pen system 100. Incorporation of a cover 194 and facilitating rapid movement thereof into place to isolate fish from surface or other contaminants, whether such contaminants algae or other types of contaminants, and bring water up from below that does not have the algae in it. As will be appreciated from a consideration of FIG. 6, tarps 194 may be unspooled from spools 196 on horizontal spans 120 between adjacent ones of the support members 110 to avoid entry of water from a particular direction, with movement of the cage 100 being effected to position the cage 100 in an area wherein uncontaminated water may then be made available to the captive fish. The movement of the tarps 194 may be remotely controlled and may, in some embodiments, be automatically adjusted in response to sensed levels of the contaminants in or about the cage (with the sending apparatus 170 being provided and adapted to fulfill such purposes).

Buoys 130 may be provided to further enhance avoidance sinking of the system 100. It may be preferable to provide a like a number of buos 130 and support members 110. The buoys are each connected to their respective one or ones of the support members by way of a line 132. The compressors 144 may be provided attached to one or more of the buoys 130, and the lines 132 may be adapted to allow for the flow of the gas there through, or additional gas (air) lines may be provided within or about the lines 132.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided as organizational cues. These headings shall not limit or characterize the invention(s) set out in any claims that may issue from this disclosure. Specifically and by way of example, although the headings refer to a "Field," such claims should not be limited by the language under this heading to describe the so-called technical field. Further, a description of technology in the "Background" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

All of the systems and methods disclosed and/or claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure.

The invention claimed is:

1. A submergible pen system for receiving a net, the system comprising:
 (a) at least four support members;
 (b) a plurality of span members connecting the support members, wherein the support members and span members collectively define a pen volume;
 (c) at least one chamber supported by one or more of the span members and the support members;

(d) at least one compressor in fluid communication with the chamber to selectively inflate the chamber with a gas; and (e) a controller in electronic communication with the compressor for controlling the operation thereof in response to operational or environmental data.

2. The system according to claim 1, wherein the at least three support members comprises at least six support members.

3. The system according to claim 2, wherein the at least six support members comprise at least eight support members.

4. The system according to claim 3, wherein the support members are positioned in a substantially octagonal arrangement.

5. The systems according to claim 2, wherein the support members are positioned in a substantially hexagonal arrangement.

6. The system according to claim 2, wherein the plurality of span members comprises at least one span member connecting each of the support members to at least an adjacent one of the support members.

7. The system according to claim 2, wherein the system and/or the span members further comprise hinge and joint members to connect the segments thereof or to the support members.

8. The system according to claim 7, wherein the hinge and joint members comprise connection members and vibration dampening members.

9. The system according to claim 1, wherein one or more of the support members is operationally positioned in a substantially vertical orientation.

10. The system according to claim 1, wherein the at least one chamber comprises a plurality of chambers.

11. The system according to claim 10, wherein the plurality of chambers comprises three chambers.

12. The system according to claim 11, wherein each of the chambers are provided in fluid communication with the plurality of compressors.

13. The system according to claim 12, wherein the chambers are each inflatable to an inflated volume and wherein the magnitude of each said inflated volume is different.

14. The system according to claim 1, wherein the system further comprises one or more sensors for gathering the operational and environmental data, and wherein the sensors are in electronic communication with the controller to provide the sensed data to the controller for processing thereby.

15. A submersible pen system comprising:
(a) at least four support members;
(b) a plurality of span members connecting the support members with the support members and span members collectively defining a pen volume;
(c) one or more net portions connected to one or more of the support members and the span members to substantially encase the pen volume;
(d) at least one chamber supported by one or more of the span members and the support members;
(e) at least one compressor in fluid communication with the chamber to selectively inflate the chamber with a gas; and
(f) a controller in electronic communication with the compressor for controlling the operation thereof in response to operational or environmental data.

16. A method of operating an aquatic net pen system, the method comprising:
(a) connecting a plurality of support members and a plurality of span members to collectively define a pen volume;
(b) determining one or more operational characteristics of the net pen system or environmental data via one or more sensors;
(b) adjusting an inflation volume of one of more chambers, wherein the inflation volume of each of the chambers comprises the quantity therein of a gas, in response to the characteristics, and thereby selectively adjusting via a controller an operation depth of the net pen system.

* * * * *